(12) United States Patent  (10) Patent No.: US 7,606,438 B2
Sugimoto  (45) Date of Patent: Oct. 20, 2009

(54) IMAGE SIGNAL PROCESSOR AND IMAGE SIGNAL PROCESSING METHOD

(75) Inventor: Kousei Sugimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 11/067,762

(22) Filed: Mar. 1, 2005

(65) Prior Publication Data

US 2005/0196064 A1  Sep. 8, 2005

(30) Foreign Application Priority Data

Mar. 5, 2004  (JP)  ............................. 2004-063018

(51) Int. Cl.
*G06K 9/40*  (2006.01)
*G06K 9/00*  (2006.01)
*G03F 3/08*  (2006.01)

(52) U.S. Cl. ........................ 382/266; 382/162; 358/519
(58) Field of Classification Search ................. 382/266, 382/162, 270, 274; 348/675; 358/519
See application file for complete search history.

(56) References Cited

U.S. PATENT DOCUMENTS

| | | | |
|---|---|---|---|
| 5,394,195 A | | 2/1995 | Herman ...................... 348/675 |
| 5,793,886 A | * | 8/1998 | Cok ............................. 382/169 |
| 5,982,926 A | * | 11/1999 | Kuo et al. ................... 382/167 |
| 7,012,719 B1 | | 3/2006 | Takahashi ................... 358/474 |
| 7,020,332 B2 | * | 3/2006 | Nenonen et al. ............ 382/169 |
| 2001/0046320 A1 | * | 11/2001 | Nenonen et al. ............ 382/169 |
| 2002/0159652 A1 | * | 10/2002 | Izume et al. ................ 382/266 |
| 2003/0179299 A1 | | 9/2003 | Okada ..................... 348/222.1 |
| 2003/0179947 A1 | * | 9/2003 | Sugimoto ................... 382/266 |

(Continued)

FOREIGN PATENT DOCUMENTS

EP  1 242 975 B1  1/2005

(Continued)

OTHER PUBLICATIONS

F.P. Ph. De Vries, "Automatic, Adaptive, Brightness Independent Contrast Enhancement," Signal Processing, vol. 21, pp. 169-182, 1990.

*Primary Examiner*—Samir A. Ahmed
*Assistant Examiner*—Stephen R Koziol
(74) *Attorney, Agent, or Firm*—Fitzpatrick, Cella, Harper & Scinto (57) ABSTRACT

To obtain an excellent edge enhancement effect even when dynamic γ correction processing is executed for an edge-enhanced image signal, and to obtain an excellent edge enhancement effect for various γ-characteristics. An edge component is detected from an input image signal. A γ correction curve is calculated based on characteristics of an image scene detected by a scene characteristic detector, and its data is stored in a dynamic γ correction RAM table and an inverse gradient RAM table. A gain controller multiplies the edge component by a control signal from the inverse gradient RAM table to generate an edge enhancement signal which is in turn added to the image signal to obtain an edge-enhanced signal. The inverse gradient RAM table sends an inverse number of a gradient of a γ correction curve corresponding to a signal level of the inputted image signal as the control signal to the gain controller. An edge-enhanced signal becomes an image signal for which dynamic γ correction is performed in accordance with a dynamic γ correction RAM table to be outputted.

8 Claims, 6 Drawing Sheets

U.S. PATENT DOCUMENTS

2005/0190968 A1  9/2005  Kanai et al. .................. 382/169

FOREIGN PATENT DOCUMENTS

| FR | 2 656 484 | 12/1989 |
| FR | 2656484 | 6/1991 |
| GB | 2 357 649 | 6/2001 |
| GB | 2357649 | 6/2001 |
| JP | 03-126377 | 5/1991 |
| JP | 3-126377 | 5/1992 |
| JP | 6-178153 | 7/1992 |
| JP | 2621244 | 6/1997 |
| JP | 10-200750 | 7/1998 |
| JP | 2000-83180 | 3/2000 |
| JP | 2003-283873 | 3/2002 |
| JP | 2002-158896 | 5/2002 |
| JP | 2003-150130 | 5/2003 |

* cited by examiner

FIG. 9 PRIOR ART
DTV SET BLOCK DIAGRAM

IMAGE SIGNAL PROCESSOR AND IMAGE SIGNAL PROCESSING METHOD

BACKGROUND OF THE INVENTION

1. Field of the Invention

The present invention relates to an image signal processor for executing edge enhancement processing and dynamic γ (luminous component) correction processing for an image signal.

2. Related Background Art

For the purpose of enhancing image quality of an image obtained based on an image signal, a television receiver executes various kinds of image signal processing. Edge enhancement processing for enhancing sharpening of an image is frequently used as one of the various kinds of image signal processing.

Conventional edge enhancement processing will hereinafter be described with reference to FIGS. 5, 6A, 6B and 6C.

Figure 5:
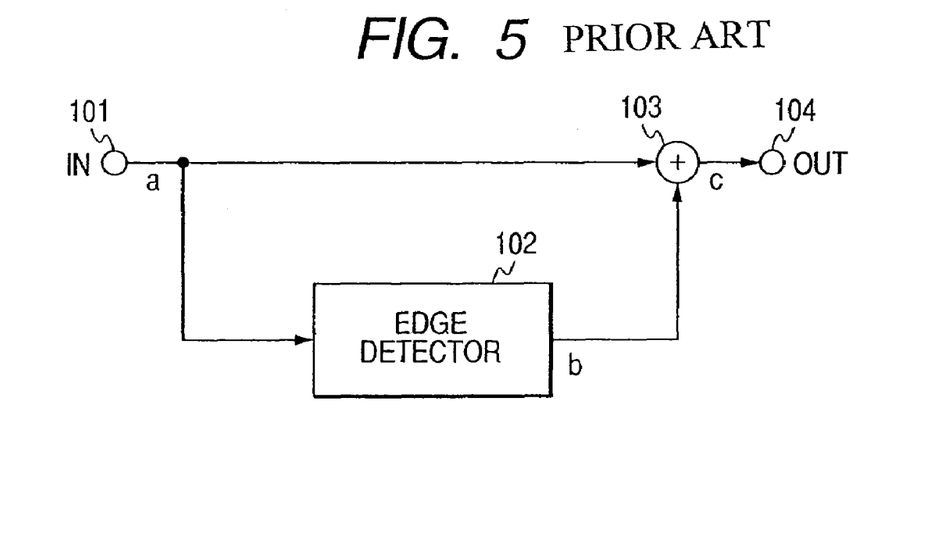
FIG. 5 is a block diagram showing a configuration of a conventional edge-enhancement unit.
Figure 6A:
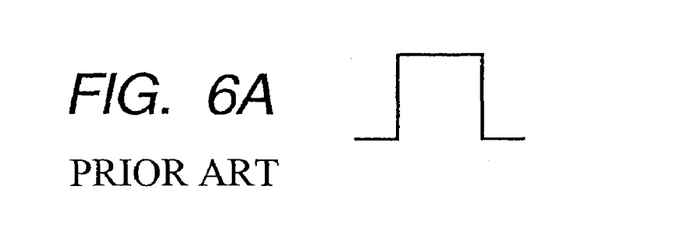
FIGS. 6A, 6B and 6C are waveform charts explaining signal processing in the conventional edge-enhancement unit.
Figure 6B:
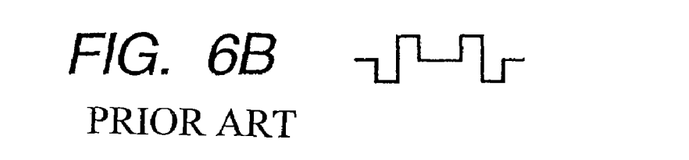
Figure 6C:
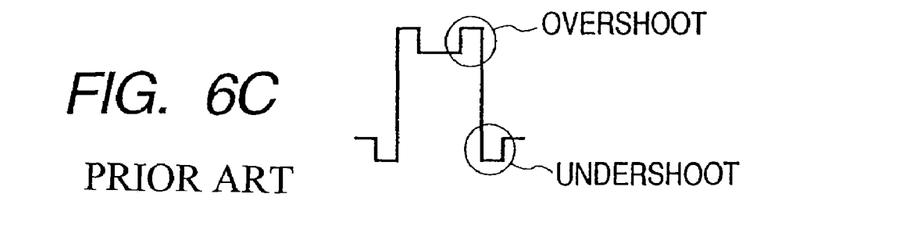

In edge enhancement processing shown in FIG. 5, the edge enhancement is carried out so as to extract a high frequency band component of an input image signal to be added to the original input image signal. FIGS. 6A, 6B and 6C show waveforms of signals a, b, and c at corresponding points in FIG. 5. For example, when the signal a is inputted to an input terminal 101, an edge detector 102 extracts a high frequency band component like the signal b from the signal a. Then, in an adder 103, the original signal a and the signal b are added to each other to obtain the signal c. By adding the high frequency band component in such a manner, an overshoot and an undershoot are added to an edge portion of an image to enhance an edge of the image.

In addition, in recent years, processing called image signal dynamic γ correction processing has attracted attention. This image signal dynamic γ correction processing is used for detecting characteristics for each scene to carry out gray-level correction corresponding to the scene, thereby realizing gray-level characteristics excellent in contrast. The conventional dynamic γ correction processing will hereinafter be described with reference to FIG. 7.

Figure 7:
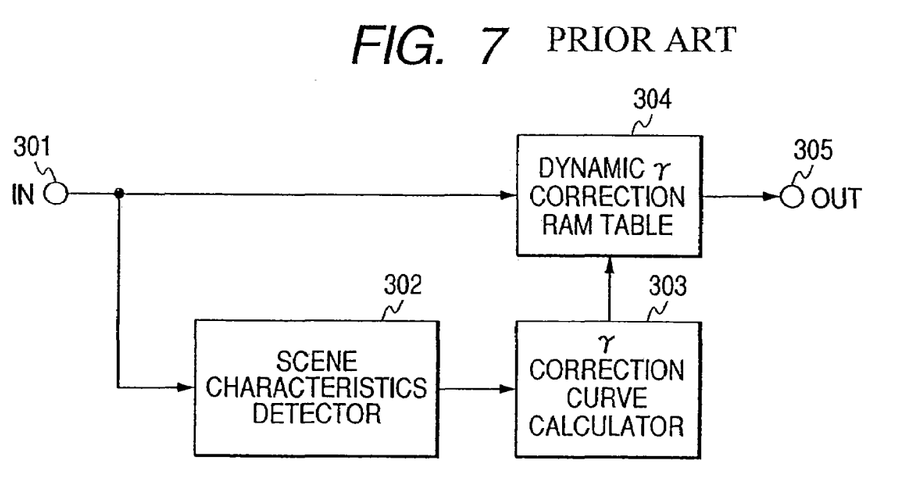
FIG. 7 is a block diagram showing a configuration of a conventional dynamic γ correction processor.
Figure 8:
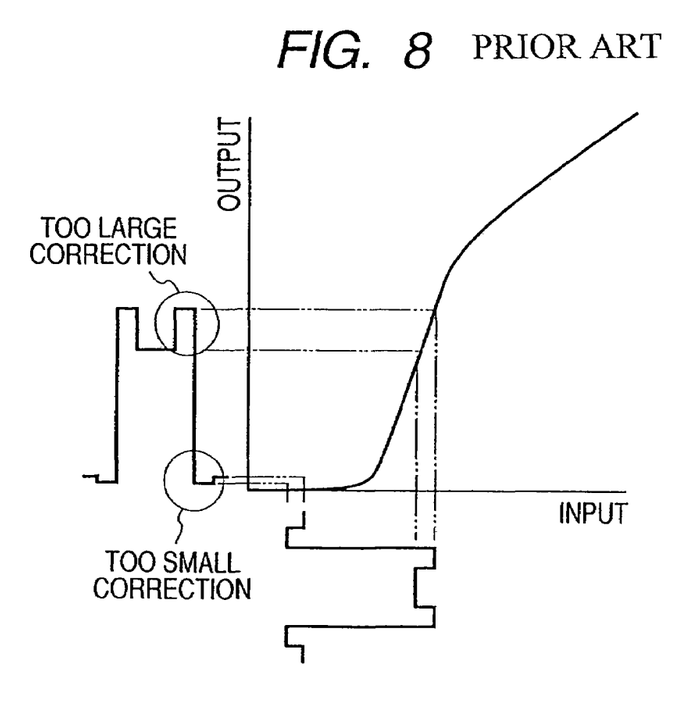
FIG. 8 is a graphical representation explaining problems associated with a related art.

When an image signal is inputted to an input terminal 301, a scene characteristic detector 302 detects characteristics of the scene. A γ correction curve calculator 303 calculates a γ correction curve based on the detected characteristics to store data on the γ correction curve in a dynamic γ correction RAM table 304. The dynamic γ correction RAM table 304 receives the image signal as an entry and then outputs a signal which is obtained through the dynamic γ correction for the image signal based on the γ correction curve the data on which is stored in the dynamic γ correction RAM table 304. In general, with a technique called histogram flattening processing, the scene characteristic detector 302 detects a histogram of a luminance distribution of a scene as characteristics, and the γ correction curve calculator 303 calculates an accumulated value of the histogram, and carries out its normalization. In addition, an invention is proposed in which not only a histogram, but also a maximum value, a minimum value, an average value, a mode value, a deviation, a black area, and a white area are detected as characteristics of a scene, and a correction amount is controlled, thereby preventing a dynamic range from spreading too much (refer to Japanese Patent Application Laid-open No. H3-126377 for example). In addition, an invention is proposed in which one of previously prepared γ correction curves is selected based on a histogram (refer to Japanese Patent Application Laid-open No. H6-178153 for example) However, mutual effects are not taken into consideration in the edge enhancement processing and the dynamic γ correction processing. Thus, when an edge-enhanced image processing signal is subjected to γ correction-processing, problems as shown in FIG. 8 arise.

1. When the enhanced edge portion is extended through the dynamic γ correction processing, the shoots are also extended, and hence the correction becomes too large correction.

2. When the enhanced edge portion is compressed through the dynamic γ correction processing, the shoots are also compressed, and hence the correction becomes too small correction.

3. When the overshoot and the undershoot are extended and compressed, respectively, the symmetry is lost and hence the image becomes an unnatural image.

In addition, in the case of the dynamic γ correction processing, the preferable gray-level correction characteristics are being currently studied, too. Hence, the γ correction curves having various non-linear characteristics may be used.

The present invention has been made in the light of the above-mentioned circumstances, and it is, therefore, an object of the present invention to obtain excellent edge enhancement effects even when dynamic γ correction processing is executed for an edge-enhanced image signal, and to propose an image signal processor and an image signal processing method in each of which excellent edge enhancement effects can be obtained even for various γ characteristics.

SUMMARY OF THE INVENTION

To achieve the above object, according to one aspect of the present invention, there is provided an image signal processor, including: an edge-enhancement unit for subjecting an input image signal to edge-enhancement processing; a dynamic γ controller for detecting a γ-characteristic in correspondence to the input image signal; and a gray-level conversion unit for executing gray-level transform processing based on the determined γ-characteristic for the output image signal subjected to the edge-enhancement processing in the edge-enhancement unit, in which the edge-enhancement unit adjusts the edge-enhancement processing in correspondence to the determined γ characteristic.

In further aspect of the image signal processor, the edge-enhancement unit preferably adjusts the edge-enhancement processing so that an original enhancement amount for the image signal through non-adjusted edge-enhancement processing is substantially equal to an enhancement amount for the image signal through adjusted edge-enhancement processing and gray-level transform processing based on the determined γ-characteristic.

In further aspect of the image signal processor, the gray-level conversion unit preferably has a gray-level conversion table to which data can be rewritten in correspondence to the determined γ-characteristic, and the edge-enhancement unit preferably adjusts the enhancement amount based on a conversion table which has characteristics inverse in gradient to those of the gray-level conversion table.

In further aspect of the image signal processor, the gray-level conversion unit preferably has a gray-level conversion table to which data can be rewritten in correspondence to the determined γ-characteristic, and the edge-enhancement unit preferably adjusts the enhancement amount through processing for inverse-conversion of data in the gray-level conversion table.

In further aspect of the image signal processor, the dynamic γ controller preferably determines the γ-characteristic in correspondence to an image scene based on the input image signal.

According to another aspect of the present invention, there is provided an image signal processing method, including the steps of: subjecting an input image signal to edge-enhancement processing; determining a γ-characteristic in correspondence to the input image signal; and executing gray-level transform processing based on the determined γ-characteristic for the input image signal subjected to the edge-enhancement processing, the method further including the step of adjusting the edge-enhancement processing in correspondence to the determined γ-characteristic in the edge-enhancement processing.

In further aspect of the image signal processing method, the edge-enhancement processing is preferably adjusted so that an original enhancement amount for the image signal through non-adjusted edge-enhancement processing is substantially equal to an enhancement amount for the image signal through adjusted edge-enhancement processing and gray-level transform processing based on the determined γ-characteristic.

According to the present invention, when the image signal for which the edge enhancement processing is already executed is subjected to gray-level-correction, the excellent edge enhancement effects can be obtained. In addition, the γ-characteristic having complicated non-linear characteristics can also be precisely corrected through the edge enhancement processing. Thus, the excellent edge enhancement effects can be similarly obtained.

DESCRIPTION OF THE PREFERRED EMBODIMENTS

Preferred embodiments of the present invention will hereinafter be exemplarily described in detail with reference to the accompanying drawings.

First Embodiment

Figure 1:
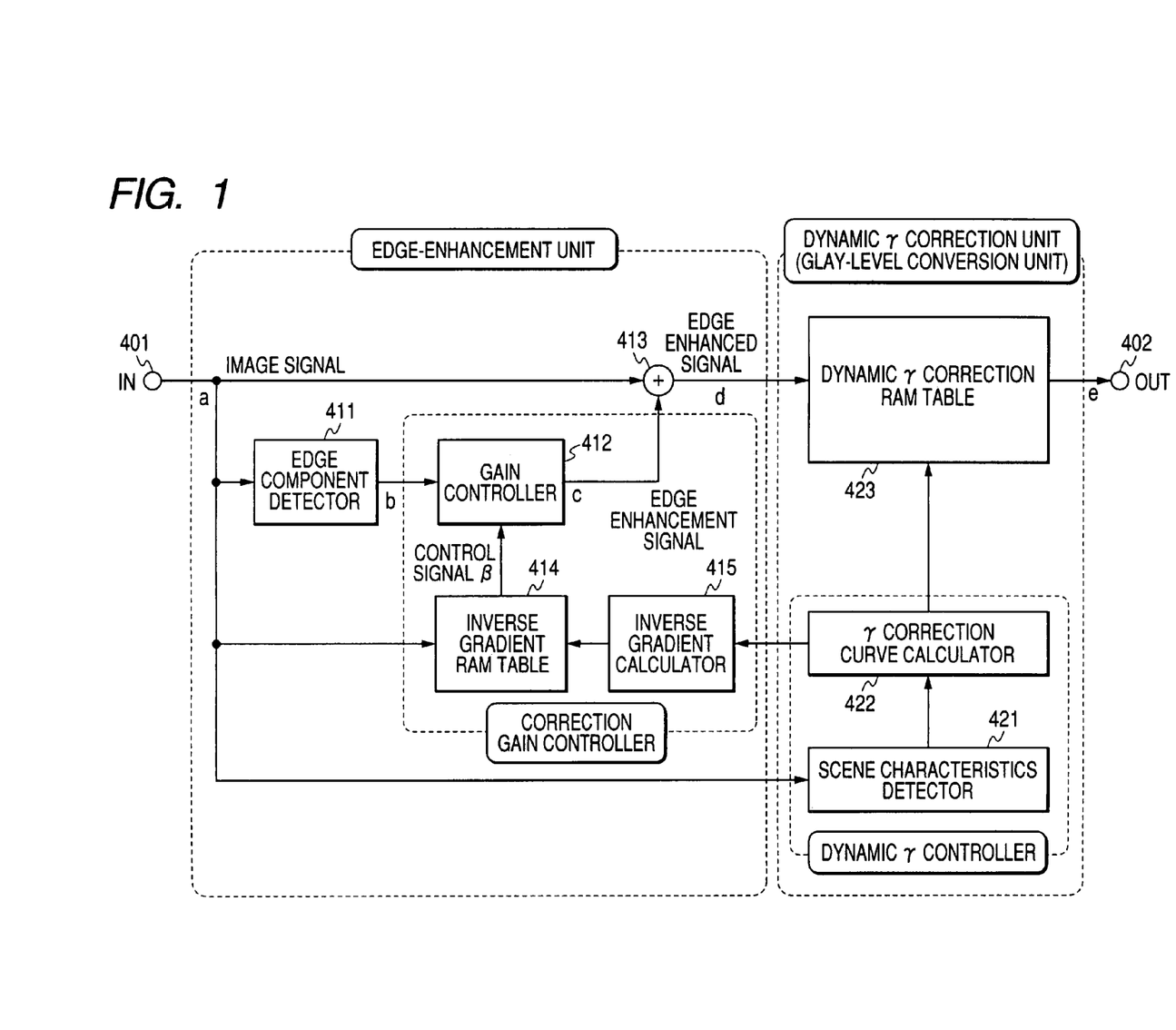
FIG. 1 is a block diagram showing a configuration of an image signal processor according to a first embodiment of the present invention.

FIG. 1 shows a block diagram showing a configuration of an image signal processor according to a first embodiment of the present invention.

In FIG. 1, an edge-enhancement unit includes an edge component detector 411, a correction gain controller, and an adder 413. The correction gain controller includes a gain controller 412, an inverse gradient RAM table 414, and an inverse gradient calculator 415. In addition, a dynamic γ correction unit corresponding to a gray-level converter includes a dynamic γ controller and a dynamic γ correction RAM table 423. Moreover, the dynamic γ controller includes a scene characteristic detector 421 and a γ correction curve calculator 422. In addition, in FIG. 1, reference symbols a, b, c, d, and e, and β designate signals at corresponding points in the circuit, respectively. An operation of the image signal processor of this embodiment configured as described above will hereinafter be described.

First of all, an input image signal a is inputted to an input terminal 401. The edge component detector 411 detects an edge component b from the image signal a. The gain controller 412 multiplies the edge component b by a control signal β sent from the inverse gradient RAM table 414 to generate an edge enhancement signal c. Then, the image signal a and the edge enhancement signal c are added to each other in the adder 413 to obtain an edge-enhanced signal d.

In addition, the scene characteristic detector 421 detects characteristics of an image scene from the image signal a for a time period of one frame. Here, the characteristics mean a histogram, a maximum value, a minimum value, an average value, a mode, a deviation, a black area, a white area, and the like. A γ correction curve is calculated based on the characteristic data in the γ correction curve calculator 422 and its data is recorded in the dynamic γ correction RAM table 423. In addition, the data on the γ correction curve is supplied to the inverse gradient calculator 415 as well. An inverse number of the gradient of the γ correction curve in each entry is calculated in the inverse gradient calculator 415 to be stored in the inverse gradient RAM table 414. The image signal a is inputted as an entry to the inverse gradient RAM table 414, and the stored inverse number of the gradient of the γ correction curve at the signal level is sent as the control signal β to the gain controller 412.

Then, the edge-enhanced signal d is inputted as an entry to the dynamic γ correction RAM table 423 to become an image signal e for which the dynamic γ correction has been carried out. The image signal e is then outputted through an output terminal 402.

As described above, before the dynamic γ correction is carried out, a gain of the edge enhancement signal is controlled with the inverse number of the gradient of the γ correction curve, whereby the shoot can be prevented from being unnaturally extended or compressed. Hence it is possible to obtain the same enhancement amount as that before the dynamic γ correction is carried out. In this embodiment, the image signal a is inputted as the entry to the inverse gradient RAM table 414. However, even if a signal of (the image signal a+the edge component b) is used as an entry, there is no problem.

Second Embodiment

Figure 2:
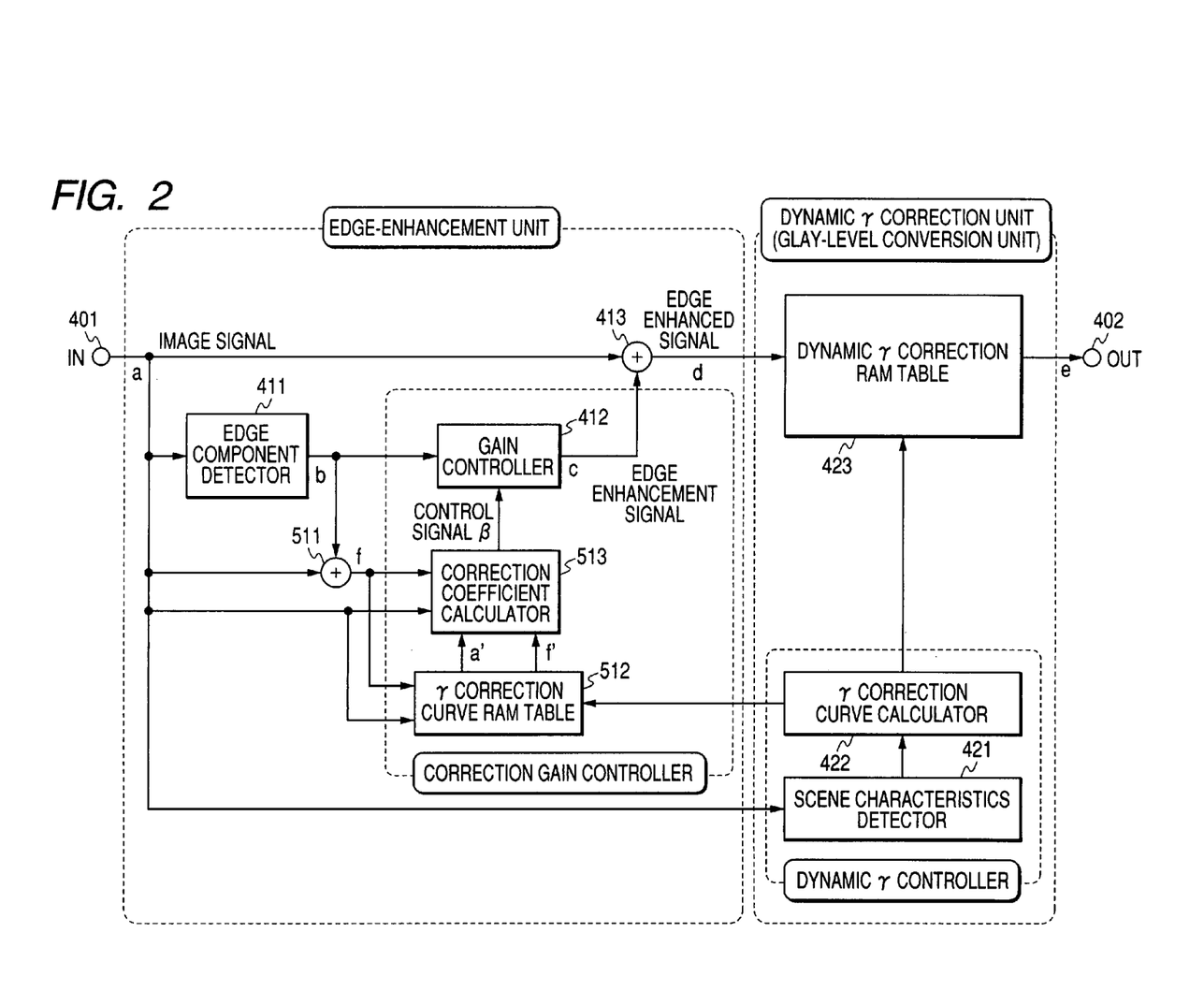
FIG. 2 is a block diagram showing a configuration of an image signal processor according to a second embodiment of the present invention.

FIG. 2 shows a block diagram showing a configuration of an image signal processor according to a second embodiment of the present invention.

In FIG. 2, reference numeral 511 designates an adder, reference numeral 512 designates a γ correction curve RAM table, and reference numeral 513 designates a correction coefficient calculator. The same constituent elements as those in the first embodiment are designated with the same reference numerals, and their descriptions are omitted here for the sake of simplicity. In this embodiment, an inverse gradient is not calculated from the γ correction curve, but data on a γ correction curve is stored as it is in the γ correction curve RAM table 512 from the γ correction curve calculator 422. Then, the image signal a, and a signal f which is obtained by adding the image signal a and the edge component b to each other are inputted as entries to the γ correction curve RAM table 512. Then, output signals a' and f' which are obtained based on the image signals a and f, respectively, are inputted to the correction coefficient calculator 513. A control signal is outputted from the correction coefficient calculator 513 to the gain controller 412. Operations of the γ correction curve RAM table 512 and the correction coefficient calculator 513 will now be described with reference to FIG. 3.

Figure 3:
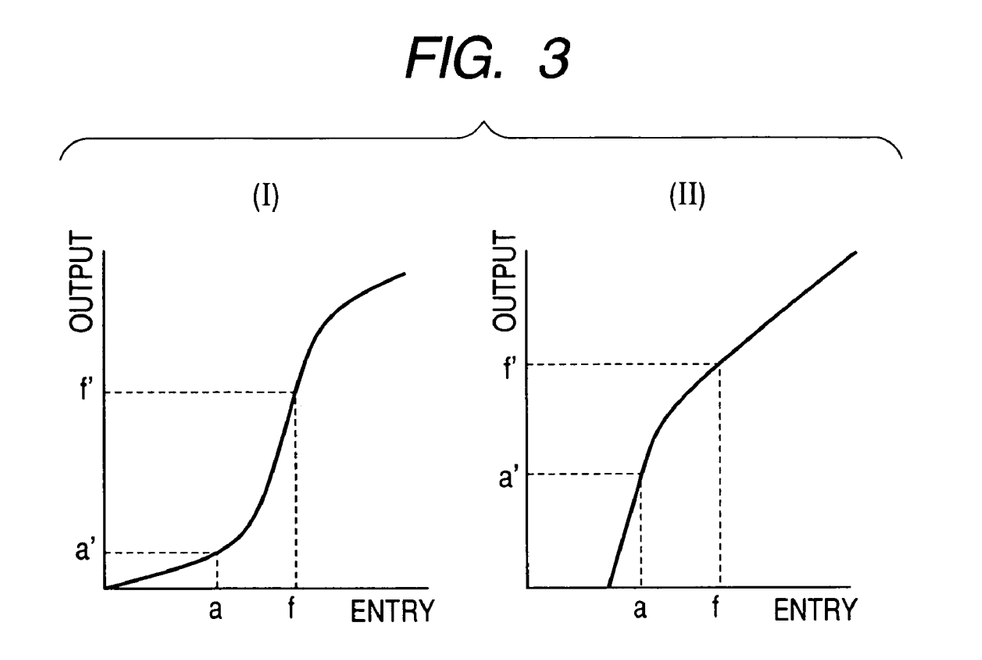
FIG. 3 is a graphical representation explaining signal processing in the image signal processor according to the second embodiment of the present invention.

A relationship between the entry and the output of the γ correction curve RAM table 512 is rewritten every scene by the γ correction curve calculator 422. Parts (I) and (II) of FIG. 3 show an example of a relationship between the entry and the output. At this time, when the image signal a and the signal f are inputted as the entries, a signal a' and a signal f' as shown in FIG. 3 are outputted to the correction coefficient calculator 513. The correction coefficient calculator 513 calculates a signal β using the signals a' and f', and the image signal a and the signal f as follows.

$$\beta = |a-f|/|a'-f'|$$

Then the correction coefficient calculator 513 outputs the signal β as a control signal to the gain controller 412.

As described above, a shoot change ratio obtained through the dynamic γ correction is previously, precisely calculated, and the magnitude of the shoot is previously corrected, whereby the shoot can be prevented from being unnaturally extended or compressed. Hence it is possible to obtain the same enhancement amount as that before the dynamic γ correction is carried out. Since the change ratio is precisely calculated in this embodiment, the correction can be effectively carried out for the γ correction curve having complicated non-linear characteristics as shown in parts (I) and (II) of FIG. 3.

Figure 4:
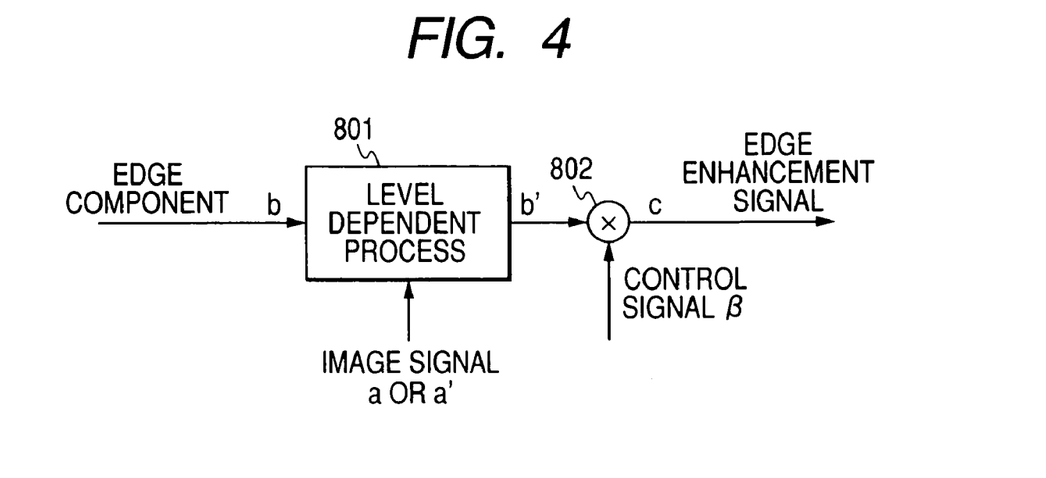
FIG. 4 is a block diagram showing a configuration of a gain controller according to a third embodiment of the present invention.

The present invention makes the edge enhancement not depending on the dynamic γ correction possible, and thus does not deny such a picturing factor as to make the magnitude of the overshoot or the undershoot asymmetric or as to change an enhancement amount depending on image signal levels. For example, in a embodiment (third embodiment) in which there is executed a so-called level dependent processing for suppressing an enhancement amount in a signal portion having a low image signal level to enhance an S/N ratio, the gain controller 412 has to be configured as shown in FIG. 4. When the image signal a is low in level, a level dependent processing unit 801 executes such processing as to reduce the edge component b. In addition, the level of the image signal a changes after completion of the dynamic γ correction processing. Thus, when the image signal a' after completion of the γ correction conversion instead of the image signal a is used as the image signal referred by the level dependent processing unit 801, it becomes possible to carry out the effective correction which does not undergo an influence of the dynamic γ correction.

While above, a delay circuit for adjusting timing for the signals has not been described in any of the first to third embodiments, it is to be understood that the delay circuit is suitably used in correspondence to a configuration of the circuit.

Figure 9:
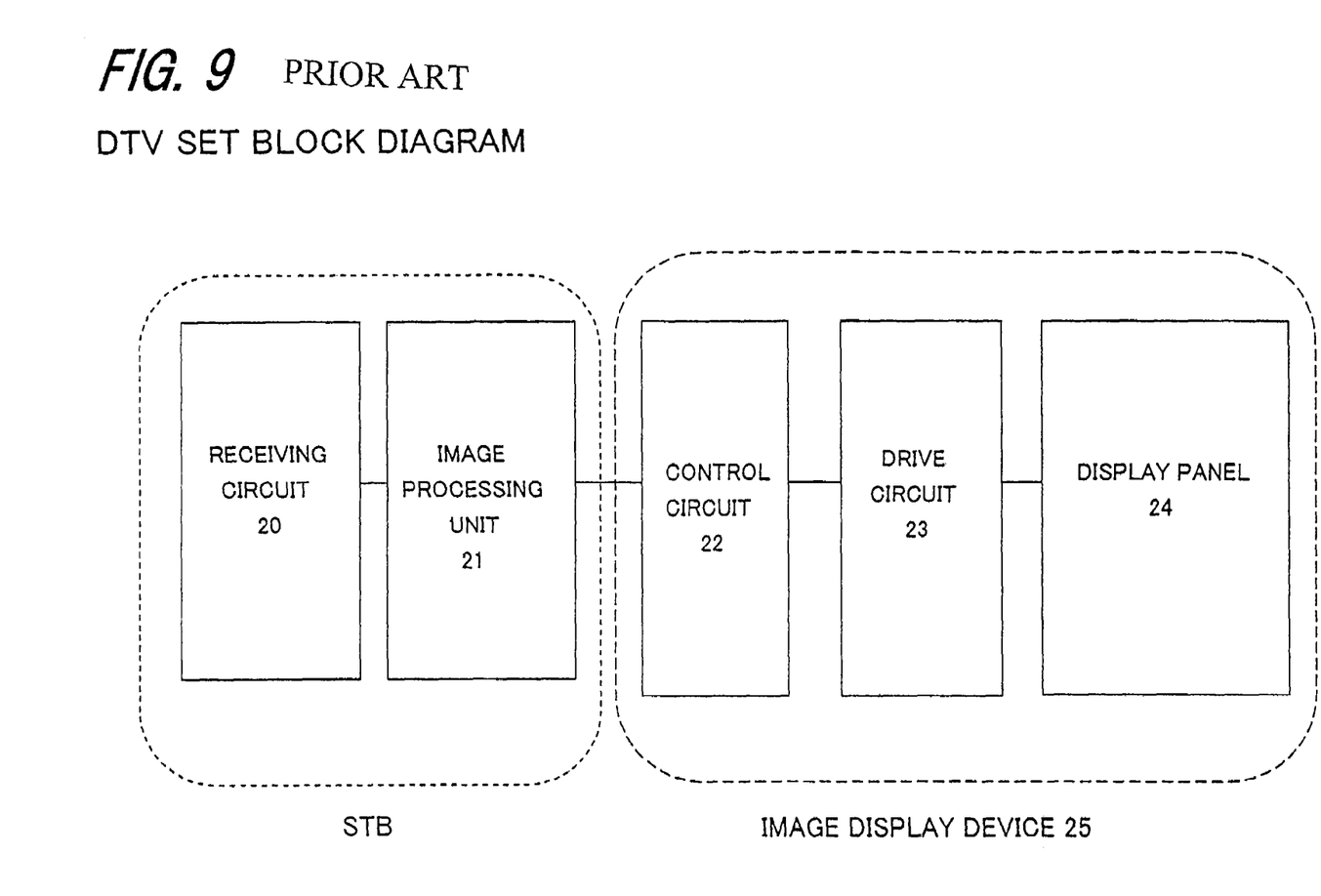
FIG. 9 is a block diagram of a television set according to the present invention.

Moreover, FIG. 9 is a block diagram showing a television set according to the present invention. A receiving circuit 20 includes a tuner and a decoder, and serves to receive a television signal on satellite broadcasting, a ground wave, or the like, or a signal on data broadcasting or the like through a network to output decoded image data to an image processing unit 21. The image processing unit 21 includes the image signal processor described in the above-mentioned embodiments as well as a γ correction circuit, a resolution conversion circuit, and an I/F circuit. The image processing unit 21 serves to convert image-processed image data into image data having a display format defined in an image display device 25, and outputs the resultant image data to the image display device 25. The image display device 25 includes a display panel 24, a drive circuit 23, and a control circuit 22. The control circuit 22 subjects the image data inputted thereto to signal processing such as correction processing suitable for the display panel 24, and outputs the image data and various control signals to the drive circuit 23. The drive circuit 23 outputs a drive signal to the display panel 24 based on the image data inputted thereto, and a television image is displayed on the display panel 24. Both the receiving circuit 20 and the image processing unit 21 may be accommodated in the form of a set top box (STB26) in a chassis different from that for the image display device 25, or may be accommodated integrally with the image display device 25 in a chassis.

This application claims priority from Japanese Patent Application No. 2004-063018 filed Mar. 5, 2004, which is hereby incorporated by reference herein.

What is claimed is:

1. An image signal processor, comprising:
   an edge-enhancement unit for obtaining an edge-enhanced signal by generating an edge enhancement signal and composing the edge enhancement signal with an input image signal;
   a γ controller for determining a γ-characteristic in correspondence to the input image signal; and
   a gray-level conversion unit for executing gray-level transform processing based on the γ-characteristic for the edge-enhanced signal,
   wherein the edge-enhancement unit is configured to detect a high frequency band component of the input image signal and to adjust the detected high frequency band component in correspondence to the γ-characteristic to obtain the edge enhancement signal so as to make the edge enhancement amount for an output image signal similar in shape to the high frequency band component of the input image signal.

2. An image signal processor according to claim 1, wherein:
   the gray-level conversion unit has a gray-level conversion table to which data can be rewritten in correspondence to the γ-characteristic, and
   the edge-enhancement unit has an inverse in gradient table in which the data is equal to the inverse of the gradient of the data in the gray-level conversion table, wherein the detected high frequency band component is adjusted based on the inverse in gradient table.

3. An image signal processor according to claim 1, wherein the edge-enhancement unit has a gray-level conversion table to which data can be rewritten in correspondence to the γ-characteristic, and
   the edge-enhancement unit is configured to control a gain for the high frequency band component of the input image data signal by using a converted input image signal and a converted signal, which are respectively the converted signals through the gray-level conversion table of the input image signal and of the signal obtained by adding the input image signal and the high frequency band component thereof.

4. An image signal processor according to claim 1, wherein the γ controller determines the γ-characteristic in correspondence to an image scene based on the input image signal.

5. An image signal processor according to claim 4, wherein the γ controller has a scene characteristic detector for detecting characteristics of the image scene from the image signal for a time period of one frame.

6. An image signal processing method, comprising the steps of:
   obtaining an edge-enhanced signal by generating an edge enhancement signal and composing the edge enhancement signal with an input image signal;
   determining a γ-characteristic in correspondence to the input image signal; and
   executing gray-level transform processing based on the γ-characteristic for the edge-enhanced signal,
   wherein the obtaining step includes a step of detecting a high frequency band component of the input image signal and adjusting the detected high frequency band component in correspondence to the γ-characteristic to obtain the edge enhancement signal so as to make the edge enhancement amount for an output image signal similar in shape to the high frequency band component of the input image signal.

7. A television set, comprising:
   an image processing unit which includes the image signal processor according to claim 1;
   a receiving unit which receives a television signal to output the input image signal to the image processing unit; and
   an image display device which displays thereon an image based on image data outputted from the image processing unit.

8. An image signal processor according to claim 3, wherein the edge-enhancement unit comprises:
   an adder for adding the input image signal and the high-frequency band component of the input image signal;
   a correction curve RAM table to receive the γ characteristic, the input image signal and the signal; and
   a correction coefficient calculator for receiving output signals from the correction curve RAM tablet, the input image signal and the output signal from the adder, and for generating a control signal to control the gain.

* * * * *